(12) United States Patent
Shepherd et al.

(10) Patent No.: US 12,609,341 B2
(45) Date of Patent: Apr. 21, 2026

(54) DEVICES AND METHODS FOR DATA COMMUNICATION AND SENSING

(71) Applicant: Cornell University, Ithaca, NY (US)

(72) Inventors: Robert F. Shepherd, Ithaca, NY (US); Hyeon Seon An, Ithaca, IN (US); Xu Liu, Ithaca, NY (US); Matthew Ryan Daniel, Ithaca, NY (US)

(73) Assignee: Cornell University, Ithaca, NY (US)

( * ) Notice: Subject to any disclaimer, the term of this patent is extended or adjusted under 35 U.S.C. 154(b) by 610 days.

(21) Appl. No.: 18/010,709

(22) PCT Filed: Jun. 15, 2021

(86) PCT No.: PCT/US2021/037525
§ 371 (c)(1),
(2) Date: Dec. 15, 2022

(87) PCT Pub. No.: WO2021/257637
PCT Pub. Date: Dec. 23, 2021

(65) Prior Publication Data
US 2023/0238559 A1 Jul. 27, 2023

Related U.S. Application Data

(60) Provisional application No. 63/039,413, filed on Jun. 15, 2020.

(51) Int. Cl.
*H01M 8/18* (2006.01)
*H01M 8/04186* (2016.01)
(Continued)

(52) U.S. Cl.
CPC ....... *H01M 8/188* (2013.01); *H01M 8/04186* (2013.01); *H01M 8/04276* (2013.01); *H01M 8/04537* (2013.01); *H01M 2250/20* (2013.01)

(58) Field of Classification Search
CPC ......... H01M 2250/20; H01M 8/04186; H01M 8/04276; H01M 8/04537; H01M 8/188; H04B 13/00; Y02E 60/50; Y02T 90/40
See application file for complete search history.

(56) References Cited

U.S. PATENT DOCUMENTS

| | | | |
|---|---|---|---|
| 4,207,568 A | 6/1980 | MacLeod | |
| 2018/0175429 A1 | 6/2018 | Gottlieb et al. | |

(Continued)

OTHER PUBLICATIONS

International Search Report and Written Opinion for PCT/US2021/037525, dated Nov. 10, 2021, 10 pages.

*Primary Examiner* — Victoria H Lynch
(74) *Attorney, Agent, or Firm* — Barnes & Thornburg

(57) ABSTRACT

A data communication device includes a battery having a first flowable electrolyte. In some embodiments, the battery is a redox flow battery (RFB) or a hybrid RFB. A first channel contains the first flowable electrolyte of the battery (i.e., contains at least a portion of the first flowable electrolyte). The first channel may include a tube and/or a reservoir. At least a portion of the first channel may be flexible and/or stretchable. The first channel has a first electrode configured to impart and/or receive a first electrical signal in the first flowable electrolyte. The first electrical signal may be a digital signal. The first electrical signal may be an encoded signal. The device may include a transceiver in electronic communication with the first electrode.

20 Claims, 9 Drawing Sheets

(51) Int. Cl.
_H01M 8/04276_ (2016.01)
_H01M 8/04537_ (2016.01)

(56) References Cited

U.S. PATENT DOCUMENTS

2018/0342752 A1    11/2018  Park et al.
2019/0355998 A1*  11/2019  Chiang  ................. H01M 8/20

* cited by examiner

10

DEVICES AND METHODS FOR DATA COMMUNICATION AND SENSING

CROSS-REFERENCE TO RELATED APPLICATIONS

This application claims priority to International Application No. PCT/US2021/037525, which claims priority to U.S. Provisional Application No. 63/039,413, filed on Jun. 15, 2020, now the disclosure of which is incorporated herein by reference.

STATEMENT REGARDING FEDERALLY SPONSORED RESEARCH

This invention was made with government support under contract no. N00014-17-1-2837 awarded by the Office of Naval Research. The government has certain rights in the invention.

FIELD OF THE DISCLOSURE

The present disclosure relates to data communication, and more particularly to data communication using a flowable electrolyte, such as the flowable electrolyte of a flow battery and/or sensing deformation using such a flowable electrolyte.

BACKGROUND OF THE DISCLOSURE

A recent field of interest is structural power—tackling energy loss in the process of integrating chemical and electrical energy sources within a robot or structural elements. In this way, system performance can be improved through avenues unavailable via the optimization of individual subsystems. In traditional devices, power subsystems, data communication subsystems, structural subsystems, and other components of a system are separate, thereby creating undesirable bulk, weight, and/or cost. There is a need for techniques for reducing these parameters.

BRIEF SUMMARY OF THE DISCLOSURE

In an aspect, the present disclosure may be embodied as a device for data communication. The device includes a battery having a first flowable electrolyte. In some embodiments, the battery is a redox flow battery (RFB) or a hybrid RFB. In some embodiments, the first flowable electrolyte is a suspension of an active lithium ion compound, a suspension of a vanadium (III) salt, a suspension of an iron (III) salt, or a suspension of a zinc salt, or other electrolyte or combinations thereof. A first channel contains the first flowable electrolyte of the battery (i.e., contains at least a portion of the first flowable electrolyte). The first channel may include a tube and/or a reservoir. At least a portion of the first channel may be flexible and/or stretchable. The first channel has a first electrode configured to impart and/or receive a first electrical signal in the first flowable electrolyte. The first electrical signal may be a digital signal. The first electrical signal may be an encoded signal. The device may include a transceiver in electronic communication with the first electrode.

In some embodiments, the device includes a blocking electrode disposed in the first channel and configured to prevent the first electrical signal in the first flowable electrolyte from transmission through the blocking electrode. The blocking electrode may be a mesh through which the first flowable electrolyte can flow. The blocking electrode (e.g., the mesh) may be configured to ground an electrical signal in the first flowable electrolyte flowing therethrough.

In some embodiments, the device includes a second electrode configured to receive the first electrical signal transmitted through the first flowable electrolyte from the first electrode and/or to impart the first electrical signal into the first flowable electrolyte. In some embodiments, the device includes a second electrode disposed in a second channel containing a second electrolyte, the second electrode being configured to impart and/or receive a second electrical signal in a second flowable electrolyte. In some embodiments, the first electrical signal and the second electrical signal are a differential pair.

In another aspect, the present disclosure may be embodied as a sensor having a channel containing a flowable electrolyte. The flowable electrolyte may be a suspension of an active lithium ion compound, a suspension of vanadium (III) salt, a suspension of iron (III) salt, or a suspension of a zinc salt, or other electrolyte or combinations thereof. At least a portion of the channel is made from a stretchable and/or flexible material. For example, at least a portion of the channel is made from one or more of polydimethylsiloxane (PDMS), silicone, natural and/or synthetic rubber, EcoFlex, Tygon, polyethylene terephthalate (PET), or Polycarbonate (PC), or other flexible and/or stretchable materials. The sensor includes a first electrode at a first location of the channel. A detector is in electronic communication with the first electrode and configured to detect a change in impedance and/or resistance of the channel. In some embodiments, a second electrode is at a second location of the channel spaced apart from the first location. In some embodiments, the detector is configured to detect a change in impedance and/or resistance of the channel by measuring a signal transmitted through the flowable electrolyte using the second electrode.

In another aspect, the present disclosure may be embodied as a method for data communication. The method includes imparting an electrical signal in a flowable electrolyte at a first location. The electrical signal is received in the flowable electrolyte at a second location. In some embodiments, the method includes preventing the electrical signal from transmission through the flowable electrolyte beyond a third location. In some embodiments, the method includes wherein each of the first location and the second location are along a length of a channel, and further comprising detecting a deformation in the channel by measuring the electrical signal to determine a change in impedance and/or resistance of the channel.

In another aspect, the present disclosure may be embodied as a robot having a device or a sensor according to any of the embodiments described herein. In some embodiments, the robot is powered by the battery of the device. In another aspect, the present disclosure may be embodied as a vehicle having a device or a sensor according to any of the embodiments described herein.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
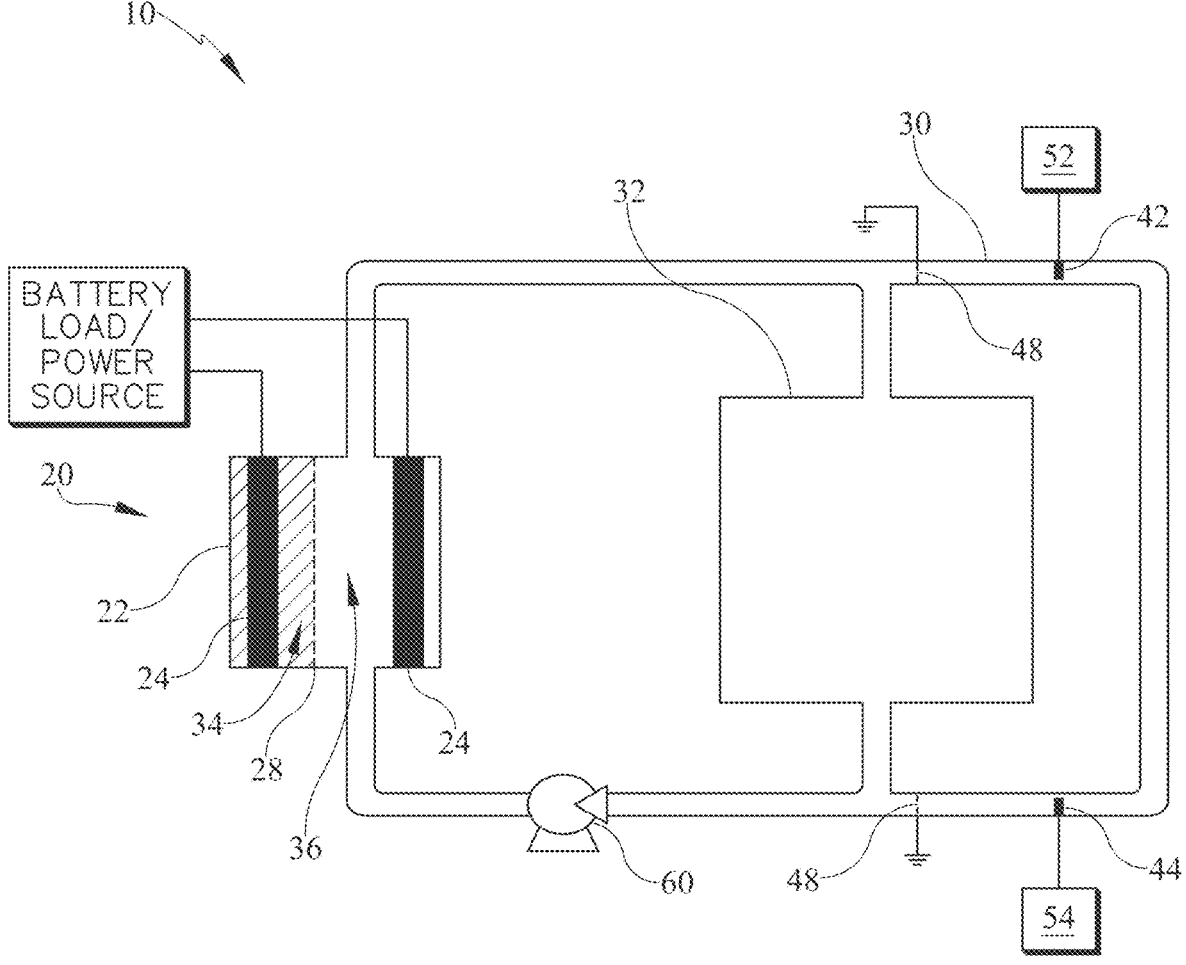
FIG. 1: A diagram showing a device according to an embodiment of the present disclosure.

In an aspect, the present disclosure allows for embedding multi-functionality in dynamic structures using a battery with a flowable electrolyte, such as, for example, a redox flow battery (RFB) to realize energy storage, data transmission, and physical deformation sensing. In some embodiments, an RFB-based structural power system includes an electrolyte circulation tubes, can act as data communication pathways to replace traditional copper wires which have restricted motion capabilities. Also, embodiments of the channels can be used as sensors that detect physical deformations of such systems. Integrating power storage, data transmission, and/or sensing functions in the RFB (e.g., RFB network), can provide many advantages including a reduction in overall system weight and an improvement in energy density.

An RFB is a battery that stores electrical energy in the form of flowable electrolyte through a redox reaction. By flowable, it is intended that the electrolyte is a liquid, gel, semi-solid, or any material that is capable of use as a hydraulic working fluid (e.g., aqueous, non-aqueous, etc.) Examples of suitable flow cell batteries include zinc-iodide batteries, vanadium batteries, and the like. Exemplary electrolytes may comprise a suspension of an active lithium ion compound (e.g., $LiCoO_2$—$Li_4Ti_5O_{12}$, $LiCoO_2$-graphite, etc.), a suspension of a vanadium (III) salt (e.g., vanadium (III) chloride, etc.), a suspension of an iron (III) salt (e.g., iron (III) chloride, etc.), a suspension of a zinc salt (e.g., zinc/bromine batteries, zinc/polyiodide batteries, zinc/iodine-bromide batteries, etc.), or the like. Depending on the battery chemistry, the energy density varies as shown in Table 1 below. Table 1 shows where a zinc/iodine-bromine redox flow battery (ZIBB RFB) exhibits the highest energy density among all reported aqueous redox flow batteries to date. In the present disclosure, signals are transmitted using the conductivity of the electrolytes in such a battery, thereby offering the potential to replace wires (e.g., copper wires, etc.) and/or other traditional communication pathways (e.g., circuit board traces, etc.) used in previous data communication techniques. Moreover, by using a stretchable channel (e.g., stretchable tube, etc.) to contain the electrolyte, the bending and stretching behaviors of the channel can be sensed. In the present disclosure, an RFB network can not only add data transmission and sensing functions but also remove the need for additional copper wire, thereby improving the overall energy density of various applications (e.g., a robot, a vehicle, such as an automobile, an aircraft, a spacecraft, etc.)

TABLE 1

Characteristics of aqueous redox flow batteries

| Battery system | Reaction | $\Delta E_{0\,cell}$ | Theoretical specific energy, Wh/kg | Demonstrated maximum volumetric energy density, Wh/L |
|---|---|---|---|---|
| Vanadium Redox Flow Battery | Cathode: $VO_2^+ + 2H^+ + e^- \leftrightarrow VO^{2+} + H_2O$ ($E^0 = 1$ V) <br> Anode: $V^{2+} \leftrightarrow V^{3+} + e^-$ ($E^0 = -0.26$ V) | 1.26 | 60.5 | 50.6 |
| Iron/Chromium Flow Battery | Cathode: $Fe^{3+} + e^- \leftrightarrow Fe^{2+}$ ($E^0 = 0.77$ V) <br> Anode: $Cr^{2+} \leftrightarrow Cr^{3+} + e^-$ ($E^0 = -0.41$ V) | 1.18 | 99 | 12.8 |
| Zinc/Bromine Flow Battery | Cathode: $Br_2 + 2e^- \leftrightarrow 2Br^-$ ($E^0 = 1$ V) <br> Anode: $Zn \leftrightarrow Zn^{2+} + 2e^-$ ($E^0 = -0.76$ V) | 1.76 | 209.4 | 61.5 |
| Zinc/Polyiodide Flow Battery | Cathode: $I^- + 2e^- \leftrightarrow 3I^-$ ($E^0 = 0.536$ V) <br> Anode: $Zn \leftrightarrow Zn^{2+} + 2e^-$ ($E^0 = -0.76$ V) | 1.29 | 87.1 | 166.7 |
| Zinc/Iodine-bromide Flow Battery | Cathode: $I_2Br^- + 2e^- \leftrightarrow 2I^- + Br^-$ ($E^0 = 0.54$ V) <br> Anode: $Zn \leftrightarrow Zn^{2+} + 2e^-$ ($E^0 = -0.76$ V) | 1.3 | 96.7 | 101 |

Figure 5A:
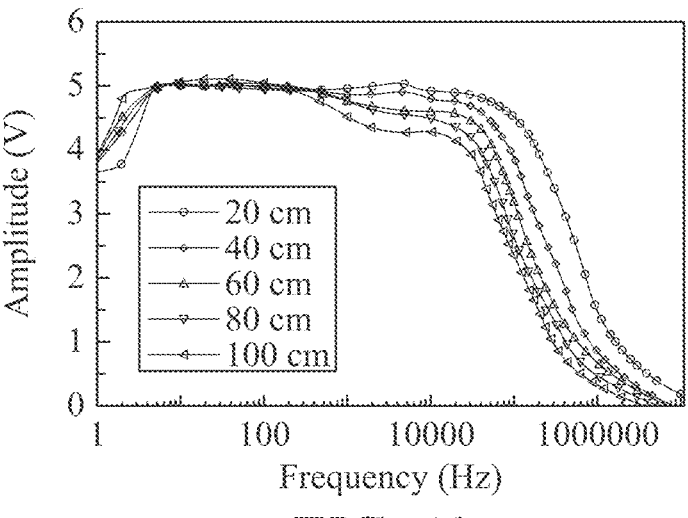
FIG. 5A: A chart showing amplitude at various frequencies, wherein each curve represents a communication length.

RFB network which can be implemented such that multiple flow batteries are connected through electrolyte circulation tubes. In another example, one or more flow batteries may be connected to non-battery components by way of channels containing electrolyte. Taking advantage of the conductivity of ions in an electrolyte, channels, such as, for example, In data communication experiments using a $ZnI_2$ electrolyte, signals with different frequencies were sent through a tube containing the electrolyte. Changes in the amplitude, phase, etc. of the signals were measured. The frequency range between 10 Hz to 10 kHz showed a flat band without significant amplitude degradation (see, e.g., FIG. 5A). The frequency response can vary depending on the chemical composition and electrolyte concentration. It is predicted that data can be transmitted using frequencies between 5 Hz to 1 GHz using the electrolytes in Table 1, though suitable frequencies will vary and may be higher or lower than this exemplary range.

In an embodiment of the present disclosure, a device includes a battery having a flowable electrolyte. The battery may be a flow battery, such as, for example, an RFB, a hybrid RFB, etc. In some embodiments, the flowable electrolyte is a catholyte and/or an anolyte of a flow battery. For example, the flowable electrolyte may be a suspension of an active lithium ion compound (e.g., $LiCoO_2$—$Li_4Ti_5O_{12}$, $LiCoO_2$-graphite, etc.), a suspension of vanadium (III) salt (e.g., vanadium (III) chloride, etc.), a suspension of iron (III) salt (e.g., iron (III) chloride, etc.), zinc (e.g., zinc/bromine, zinc/polyiodide, zinc/iodine-bromide, etc.), or the like.

FIG. 1 depicts a device 10 according to an embodiment of the present disclosure and having a battery 20 (a hybrid RFB is depicted in the example of FIG. 1). The battery 20 has a housing 22 containing at least one flowable electrolyte (such as, for example, catholyte 36). A cation exchange membrane 28 separates anolyte 34 from catholyte 36. Electrodes 24 are disposed on each side of the membrane 28 (e.g., a first battery electrode is disposed in the anolyte and a second battery electrode is disposed in the catholyte). Each battery electrode 24 of the battery may be connected to a load, a power source (e.g., to recharge the battery), and/or other connections as is known for batteries (series/parallel with other batteries, etc.) In some embodiments, the battery 20 may include a pump 60 to circulate the electrolyte.

A first channel 30 contains at least a first portion of the flowable electrolyte. The first channel may be a reservoir, a tube, a pipe, a container, and/or any configuration capable of holding and/or passing the flowable electrolyte. The first channel may make up a portion of the battery. The first channel may be external to the battery. For example, a tube may be configured to fluidically couple a second battery (or more) to the first battery. In this way, a network (e.g., an RFB network) can be created by coupling one or more additional batteries. In another example, the first channel is a reservoir configured to contain a volume of flowable electrolyte for use by the battery. In some embodiments, at least a portion of the first channel is stretchable and/or flexible (e.g., made from a stretchable and/or flexible material), as further discussed below.

The first channel 30 includes a first electrode 42 (sometimes referred to herein as a signal electrode) configured to impart and/or receive a first electrical signal in the flowable electrolyte. For example, the first electrode may be configured as a pin, tab, spade, peg, wire, mesh, wire bundle, and/or any other configuration suitable for electrodes or combination of configurations. The first electrode may be disposed within the first channel. In some embodiments, the first electrode may make up a portion of a channel wall or be otherwise configured so as not to impede a flow of the flowable electrolyte. The first electrode may be formed of any electrical conductor such as, for example, a metal (e.g., Au, Ag, Cu, Ni, stainless steel, Al, Zn, alloys, etc.) or other electrically-conducting materials. In some embodiments, the first electrode is an electrode of the battery (e.g., a battery electrode used to draw power from the battery and/or provide power to the battery for recharging). The first electrode may be configured to impart and/or receive a communication signal (first electrical signal). For example, the signal may be an encoded signal, such as, a signal encoded on a carrier frequency. The signal may be a digital signal. The signal may be a digital signal encoded on a carrier frequency. The signal may use other encoding schemes as is known in the art. The device 10 may include a transceiver 52 in electronic communication with the first electrode 42.

In some embodiments, the device 10 may further comprise a blocking electrode 48 disposed in the first channel 30. The blocking electrode is configured to prevent an electrical signal in the flowable electrolyte from transmission through the blocking electrode (for example, while allowing passage of the flowable electrolyte). By preventing an electrical signal, it is intended that a blocking electrode is configured to attenuate a signal to a level (e.g., amplitude) which is not significant to the application at hand—i.e., the signal need not be completely eliminated to be considered "prevented" from transmission through a blocking electrode. For example, in various embodiments, electrical signals are prevented from transmission through a blocking electrode by attenuation to less than 10%, 5%, 2%, or 1% of the signal amplitude. In some embodiments, the signal is attenuated to a level indistinguishable from noise. In an RFB network, it may be advantageous to select and route data among the numerous electrolyte circulation tubes that make up the RFB network, so as to provide signals to the correct network node(s) and if desired, to avoid being read by wrong network node(s). A blocking electrode in the form of, for example, a metal mesh can be applied for blocking unwanted signals while allowing the electrolyte to flow freely. The blocking electrode may be configured to ground the electrical signal—i.e., provide a path to ground—in order to attenuate the signal. The term "ground" is intended to include configurations using an earth ground and configurations using a circuit ground (a common return path for electrical current).

Figure 2A:
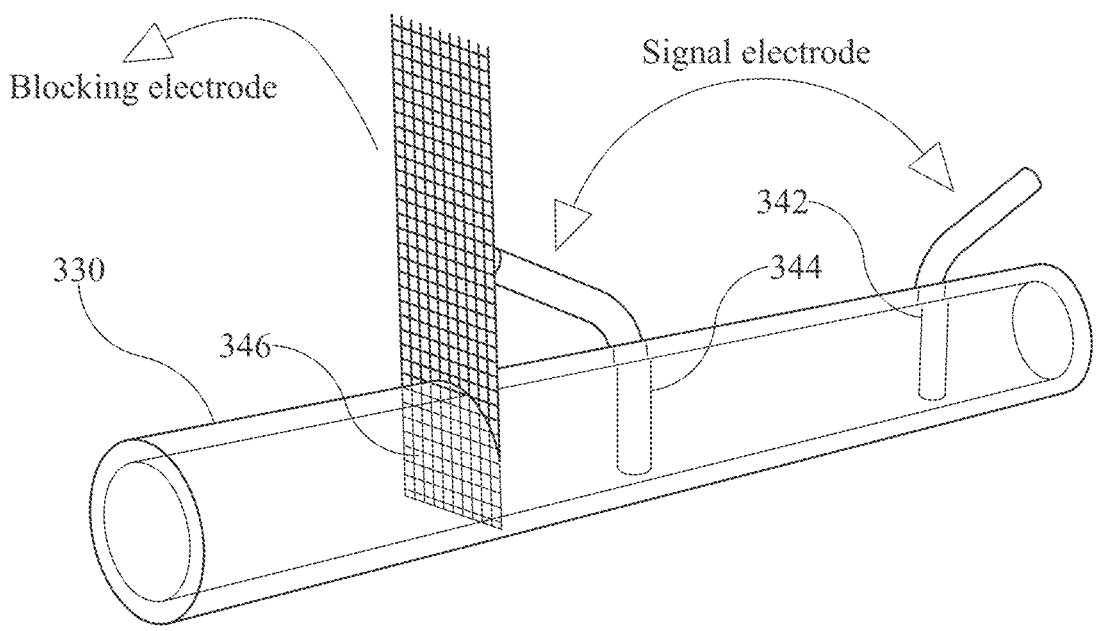
FIG. 2A: A tube showing exemplary positions of signal electrodes and a blocking electrode.
Figure 2B:
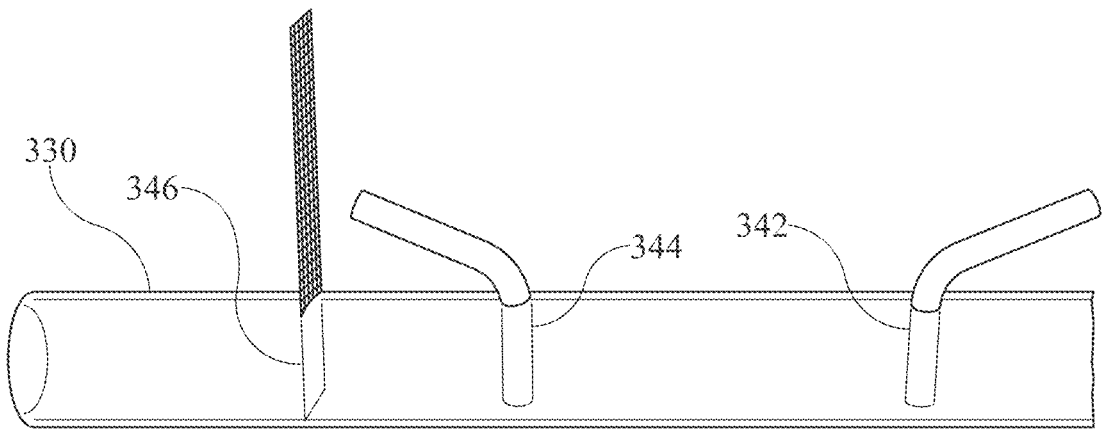
FIG. 2B: A side elevation view of the tube and electrodes of FIG. 2A.
Figure 3A:
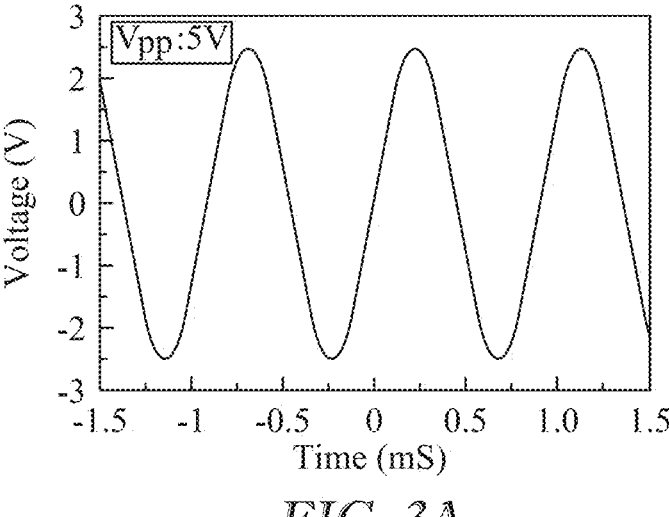
FIG. 3A: Shows a signal transmitted in an experiment, measured at the sending signal electrode (second electrode).
Figure 3B:
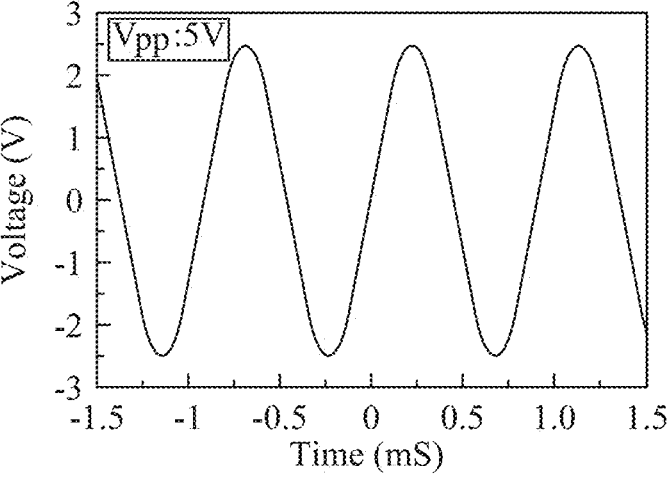
FIG. 3B: Shows the signal of FIG. 3A as received at the receiving signal electrode (first electrode).
Figure 3C:
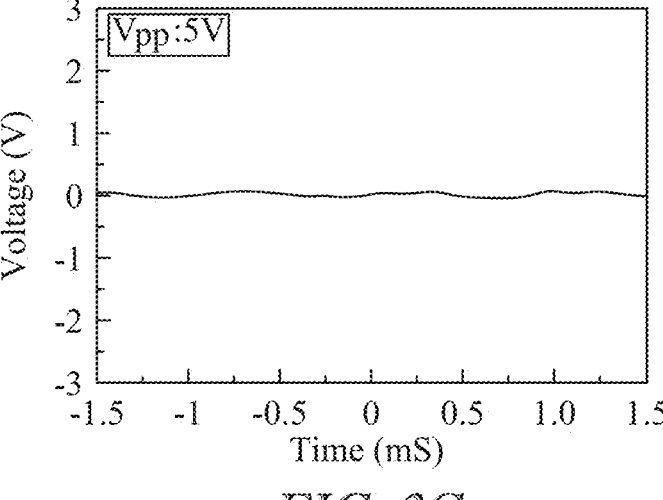
FIG. 3C: Shows the signal of FIG. 3A (or lack of signal) measured after the blocking electrode (on a side of the blocking electrode opposite the two signal electrodes).

FIGS. 2A and 2B shows an embodiment used to test signal transmission and blocking. A tube 330 (diameter: 4 mm, length: 20 cm) containing an electrolyte includes a first electrode 342 spaced apart from a second electrode 344. A blocking electrode 346 was spaced apart from the second electrode 344 on an opposite side from the first electrode 342 (i.e., not between the first and second electrodes). The blocking electrode 346 was connected to "ground."A signal (frequency: 1 kHz, amplitude: 5 V) was transmitted from the second electrode 344 to the first electrode 342 through the electrolyte. FIGS. 3A and 3B shows the signal at each electrode, demonstrating the ability to transmit a signal between the electrodes without significant degradation even though a blocking electrode was present. As shown in FIG. 3C, the electric field was almost completely attenuated after the grounded blocking electrode such that no significant signal passed through the blocking electrode. By using these blocking electrodes, a signal can be limited to only desired sections of a device (between signal electrodes). Also, after (to the left of) the blocking electrode 346, the signal was attenuated as shown in FIG. 3C. This shows the capability for cross-talk between tubes and data transfer without significant interference on an RFB network sharing electrolyte. Various conductors (e.g., metal materials (e.g., Au, Ag, Cu, Ni, stainless steel, Al, Zn, alloys, etc.)) and various configurations (e.g., single wire, mesh, wire bundle, grid, etc.) can be used for signal electrodes and blocking electrodes.

In some embodiments, the device 10 may include a second electrode 44 disposed in the flowable electrolyte. For example, a second electrode may be disposed in the first channel or in a second channel in fluidic communication with the first channel (e.g., directly or indirectly coupled to the first channel). The second electrode may be configured to receive the first electrical signal transmitted through the flowable electrolyte from the first electrode and/or impart the first electrical signal into the flowable electrolyte (e.g., for reception by the first electrode and/or other electrodes). In this way, a node 52 connected to the first electrode 42 may send and/or receive signals with a node 54 connected to the second electrode 44.

Figure 4:
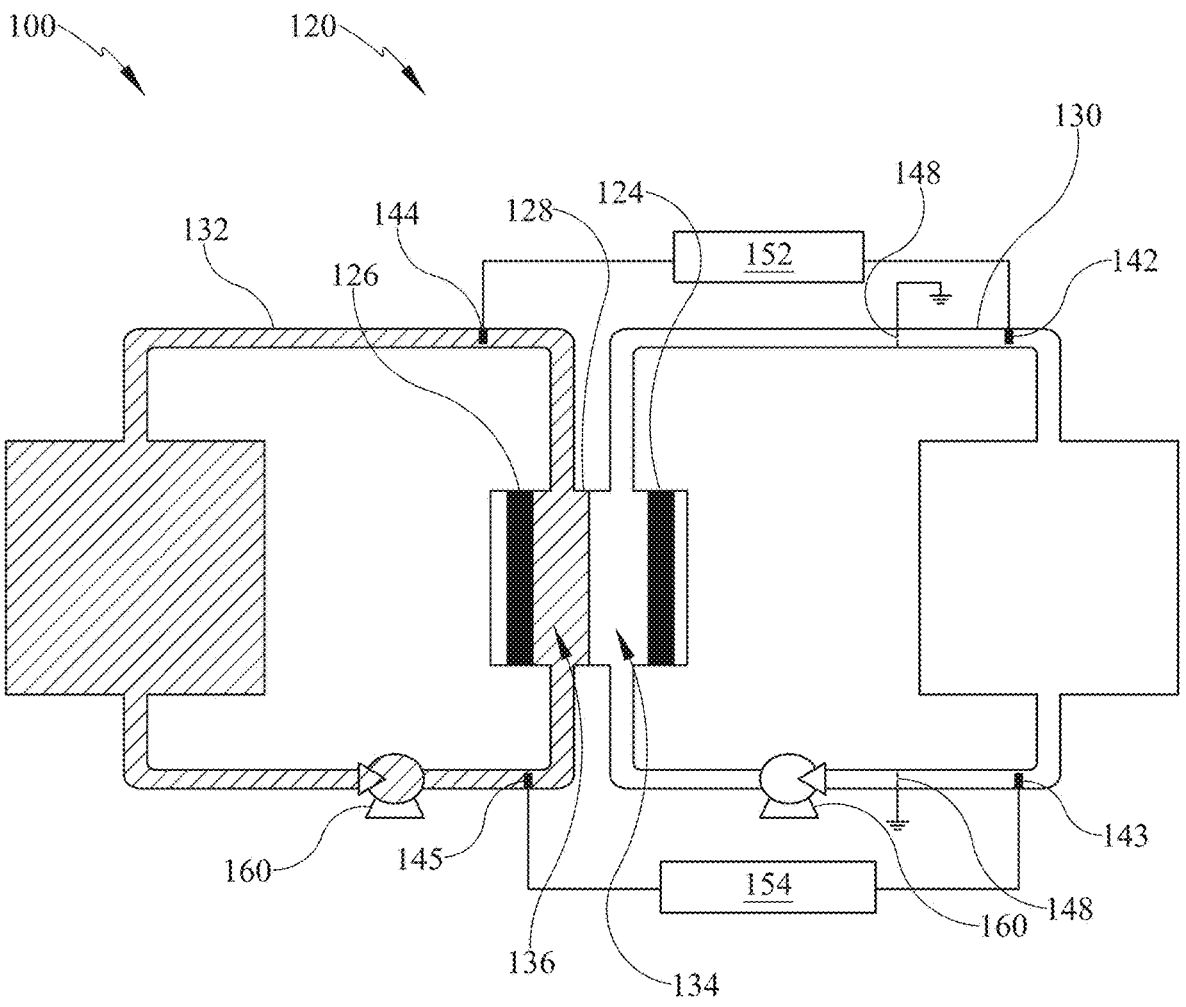
FIG. 4: A diagram showing a device according to another embodiment of the present disclosure.

In another embodiment shown in FIG. 4, a device 100 comprises an RFB battery 120 with an electrode 124 disposed in a first flowable electrolyte (anolyte 134) and an electrode 126 disposed in a second flowable electrolyte (catholyte 136) separated by a membrane 128. Pumps 160 circulate the anolyte and catholyte through the tubes and reservoirs of the RFB battery. A first electrode 142 is disposed in the first flowable electrolyte contained in a first channel 130. The first electrode 142 is configured to impart and/or receive a first electrical signal into the first flowable electrolyte. A second electrode 144 is disposed in the second flowable electrolyte contained in a second channel 132. The second electrode 144 is configured to impart and/or receive a second electrical signal into the second flowable electrolyte. In some embodiments, the first and second channels may be considered a differential pair and the first electrical signal and second electrical signal may together form a differential signal (as further described below). For example, a transceiver 152 may be configured to transmit and/or a signal as a differential signal (formed by the first electrical signal and the second electrical signal).

A third electrode 143 may be disposed in the first flowable electrolyte and configured to receive the first electrical signal transmitted through the first flowable electrolyte from the first electrode and/or to impart the first electrical signal into the first flowable electrolyte. The third electrode may be disposed in the first channel or elsewhere. A fourth electrode 145 may be disposed in the second flowable electrolyte and configured to receive the second electrical signal transmitted through the second flowable electrolyte from the second electrode and/or to impart the second electrical signal into the second flowable electrolyte. The fourth electrode may be disposed in the second channel or elsewhere. The third and fourth electrodes may cooperate to form a differential pair similar to the first and second electrodes. For example, a transceiver 154 may be configured to transmit and/or receive the differential signal formed by the first and second signal (in the embodiment described above).

One or more blocking electrodes 148 may be configured to prevent transmission of the first electrical signal and/or the second electrical signal through each blocking electrode. In other embodiments, the first electrical signal may use a carrier frequency which is different from a carrier frequency of the second electrical signal. In other embodiments, the first and second electrical signals may use difference encoding schemes from one another. Other techniques for simultaneous signal transmission (e.g., multiplexing) of the first and second signals (and other signals, if any) will be apparent to one having skill in the art in light of the present disclosure.

Figure 6:
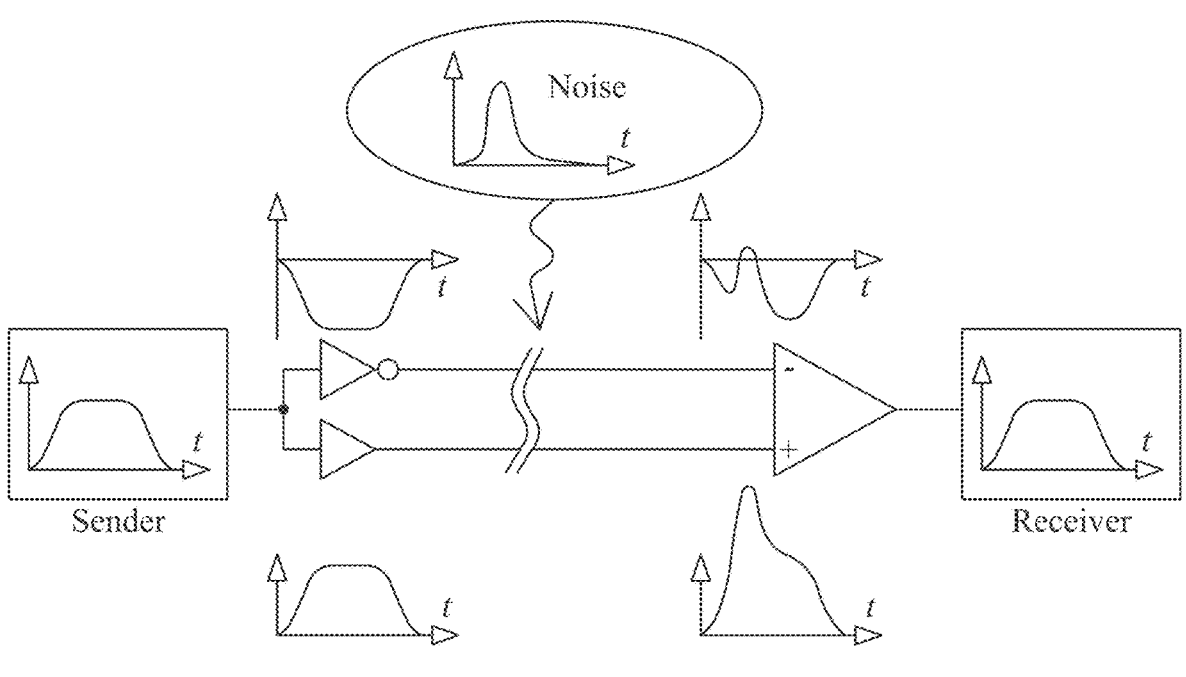
FIG. 6. A diagram illustrating the principle of differential signaling technology.

In data transmission through an electrolyte, differential signaling can be used by transmitting information electrically with two complementary signals sent on two paired wires. One information signal requires a pair of conductors: one carries the signal and the other carries the inverted signal—called a "differential pair." The receiver extracts information by detecting the potential difference between the inverted and non-inverted signals. When merging two signals, noise signals are canceled, and only meaningful ones remain (FIG. 6). Differential communication technologies typically included Ethernet, Universal Serial Bus (USB), PIC, High-Definition Multimedia Interface (HDMI), IEEE 1394 (FireWire), RS-422, RS-485, Serial Peripheral Interface (SPI), etc. This technique improves the rejection of noise as compared with the use of only one wire and an un-paired ground, which makes it a good choice for reducing the effect of noise signals and for accurate data communication. In an embodiment of the present disclosure, a second electrode and a second channel are used to transmit a second electrical signal. In some embodiments, a second channel contains a second flowable electrolyte. The second flowable electrolyte may be an electrolyte which is physically separated from the first flowable fluid. In some embodiments, the second flowable electrolyte is a second portion of the first flowable electrolyte, wherein the first and second portions are electrically isolated from each other (for example, using one or more blocking electrodes). The second electrical signal may be an inverted first electrical signal, for example, for use with differential signaling.

Figure 5B:
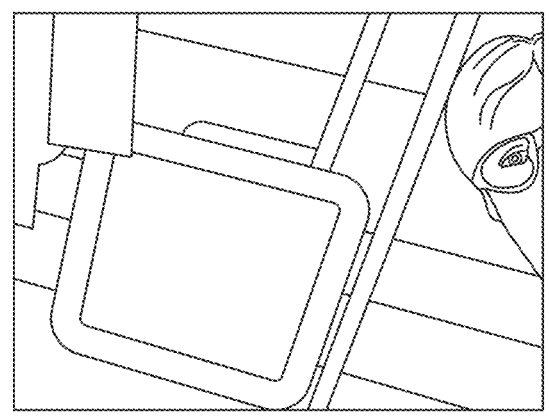
FIG. 5B: Image captured by a camera and sent to a microcontroller using the electrolyte of a redox flow battery system.
Figure 5C:
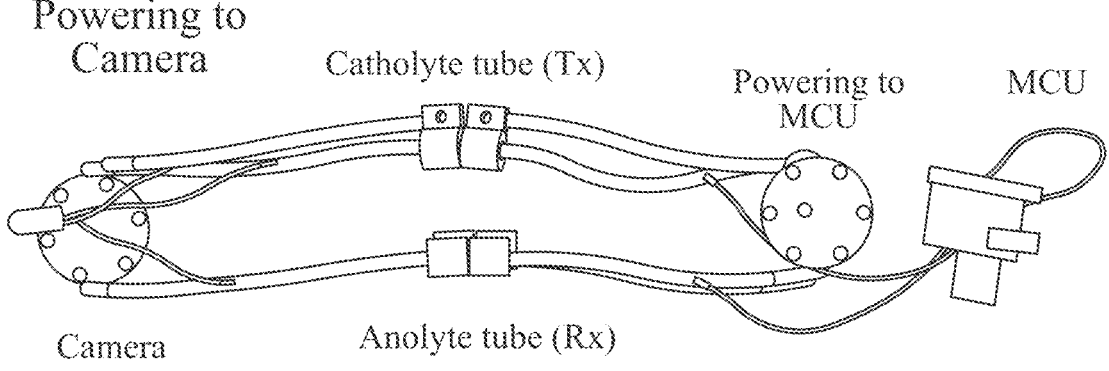
FIG. 5C: The exemplary two flow battery network system for data communication used to send the image of FIG. 5B.

FIG. 5C shows a camera system constructed to demonstrate an application of the present device. The system includes an RFB which powers a camera and a microcontroller unit (MCU). As such, each of the camera and MCU are connected to the RFB to receive electrical power. In addition, each of the camera and the MCU are connected to the catholyte and electrolyte of the RFB to send and receive data. As such, the camera was able to send image data to the MCU using the flowable electrolytes of the RFB for data communication. FIG. 5B shows a photograph taken with the camera and transmitted to the MCU using the electrolytes of the RFB. In another aspect, a robot includes a device according to any of the embodiments disclosed herein. The robot, or a component of the robot, may be powered by the battery of the device. In another aspect, a vehicle includes a device according to any of the embodiments disclosed herein. The vehicle, or a component of the vehicle, may be powered by the battery of the device.

Figure 7:
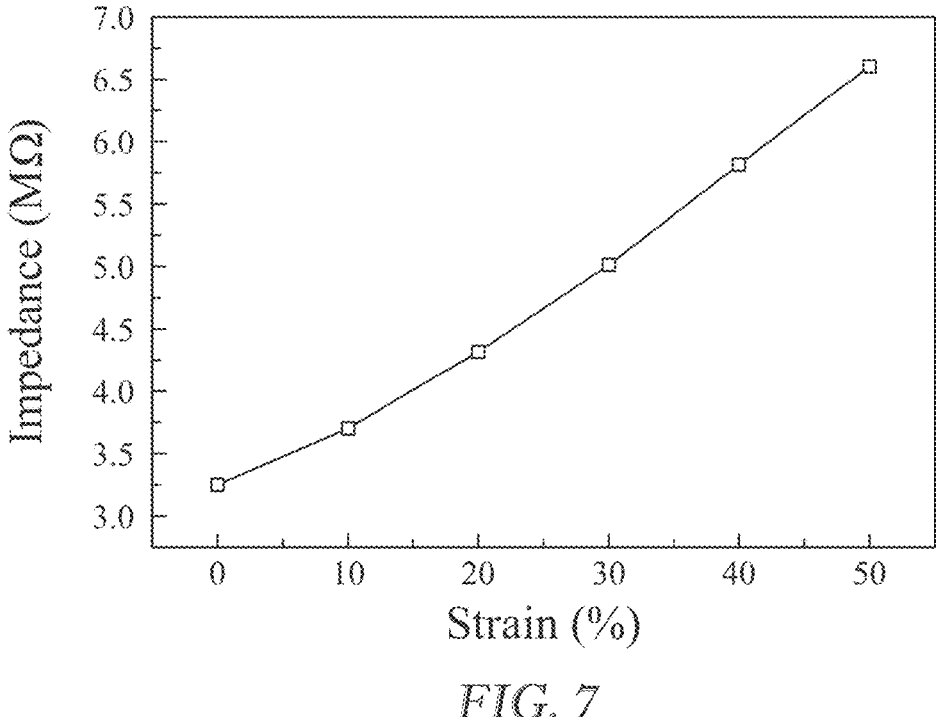
FIG. 7. A chart showing impedance vs. tensile strain in an exemplary sensor according to another embodiment of the present disclosure.

In another aspect, the present disclosure may function as a sensor capable of sensing physical deformation (bending, stretching) by using electrolyte contained in a channel and where at least a portion of the channel is stretchable and/or flexible. For example, various elastomer-based stretchable tubes (e.g., polydimethylsiloxane (PDMS), silicone, natural and/or synthetic rubber, EcoFlex, etc.) and polymer-based flexible tubes (e.g., Tygon, polyethylene terephthalate (PET), Polycarbonate (PC), etc.) can be used. As the tube is bent or stretched, the dimension of the tube changes, which changes the impedance and resistance of the entire tube and physical deformation can be sensed. For example, when stretched, the diameter of a tube may narrow. As shown in FIG. 7, the impedance was approximately doubled as the tube (diameter: 4 mm, length: 15 cm) was stretched to 50%. In another example, when bent, a cross-sectional shape and/or size of a tube may vary (see, e.g., FIG. 8A). The impedance was shown to change based on the bending angle (FIG. 8B). This makes it possible to sense the physical deformation of devices used in various applications such as robots and vehicles using an electrolyte tube.

Figure 8A:
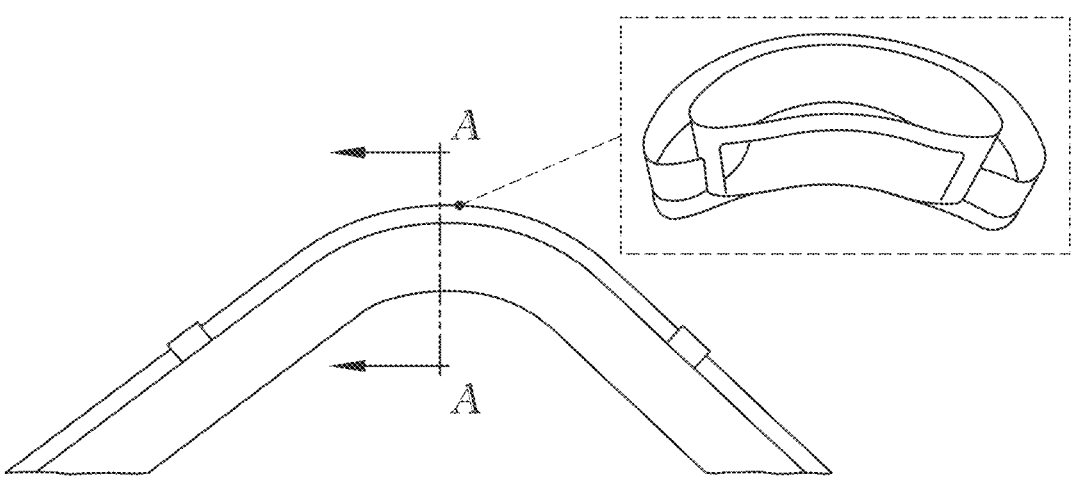
FIG. 8A: An illustration of a bent channel (tube) and a cross-section (inset) taken at A-A.
Figure 8B:
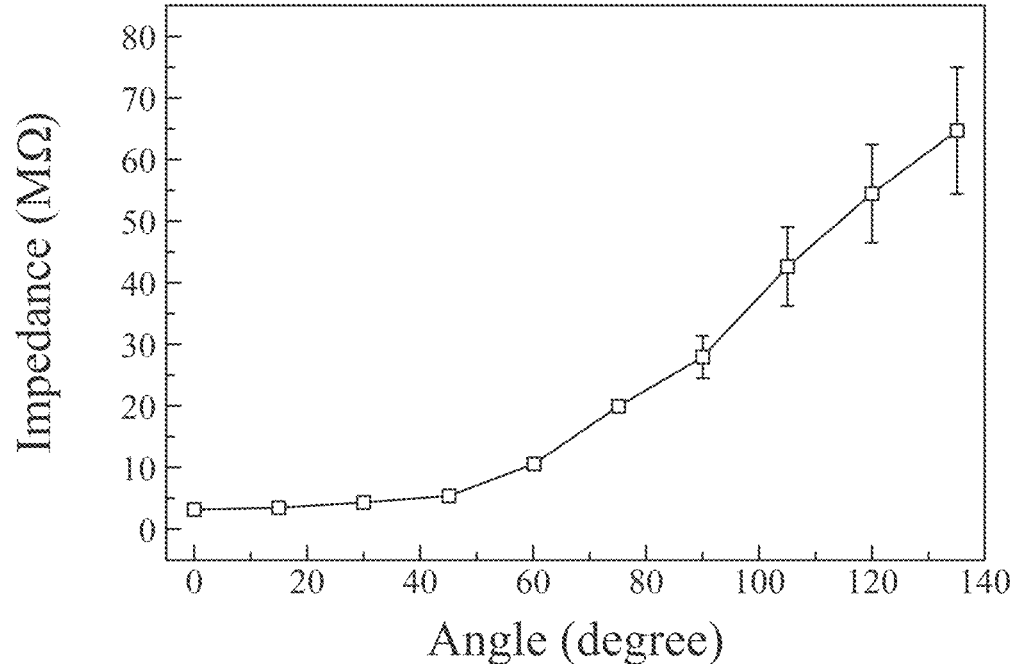
FIG. 8B: A chart showing impedance vs. bending angle of the tube show in FIG. 8A.
Figure 9:
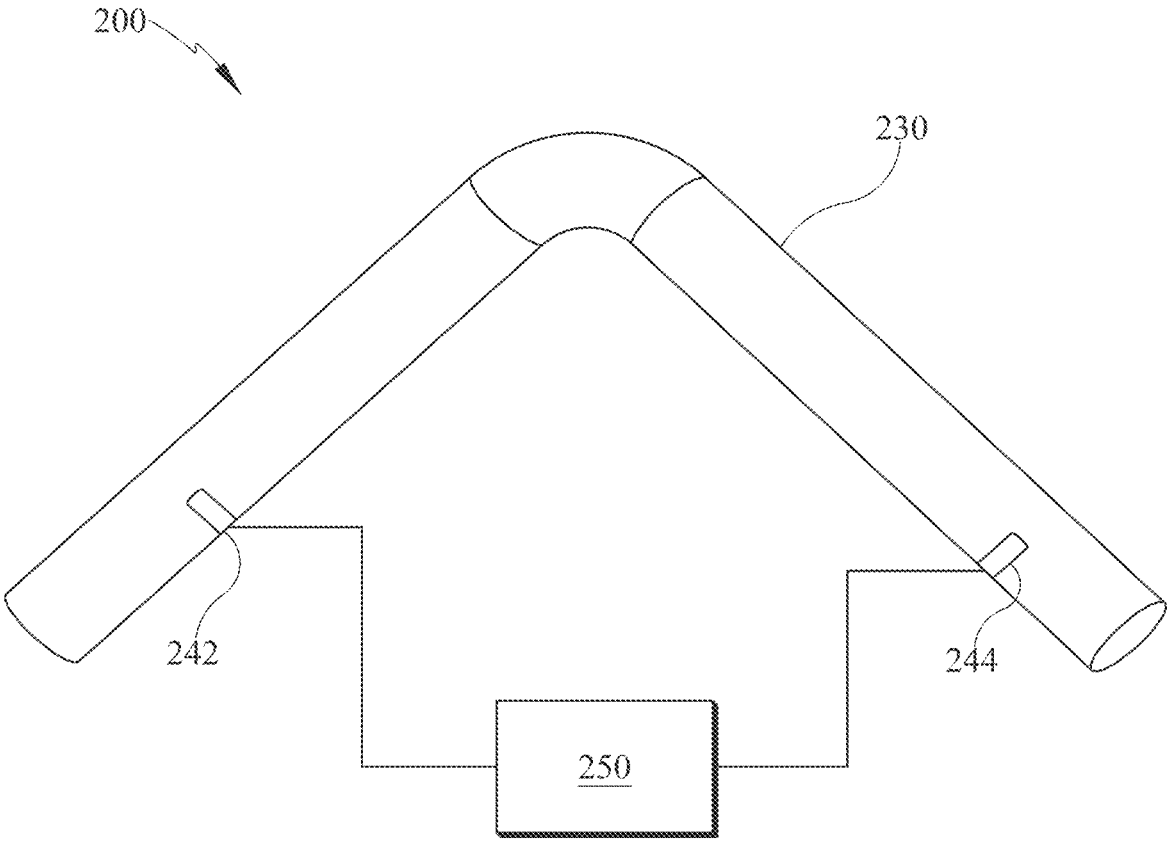
FIG. 9: A diagram of a sensor according to another embodiment of the present disclosure.

With reference to FIG. 8A, the present disclosure may be embodied as a sensor 200 having a channel 230 containing a flowable electrolyte as described above. For example, the channel may be a tube or other channel as described above. At least a portion of the channel 230 may be made from a stretchable and/or flexible material. For example, the channel, or a portion thereof, may be from one or more of polydimethylsiloxane (PDMS), silicone, natural and/or synthetic rubber, EcoFlex, Tygon, polyethylene terephthalate (PET), Polycarbonate (PC), etc. The sensor 200 includes a first electrode 242 at a first location of the channel 230 and disposed in the electrolyte. A detector 250 is in electronic communication with the first electrode 242. The detector is configured to detect a change in impedance and/or resistance of the channel using the first electrode and/or second electrode. In some embodiments, a second electrode 244 is located at a second location of the channel 230 (spaced apart from the first location) and disposed in the electrolyte. The detector 250 may be configured to detect a change in impedance and/or resistance of the channel 230 by measuring a signal transmitted using the second electrode 244. In some embodiments, the detector is in electronic communication with both of the first and second electrodes.

Figure 10:
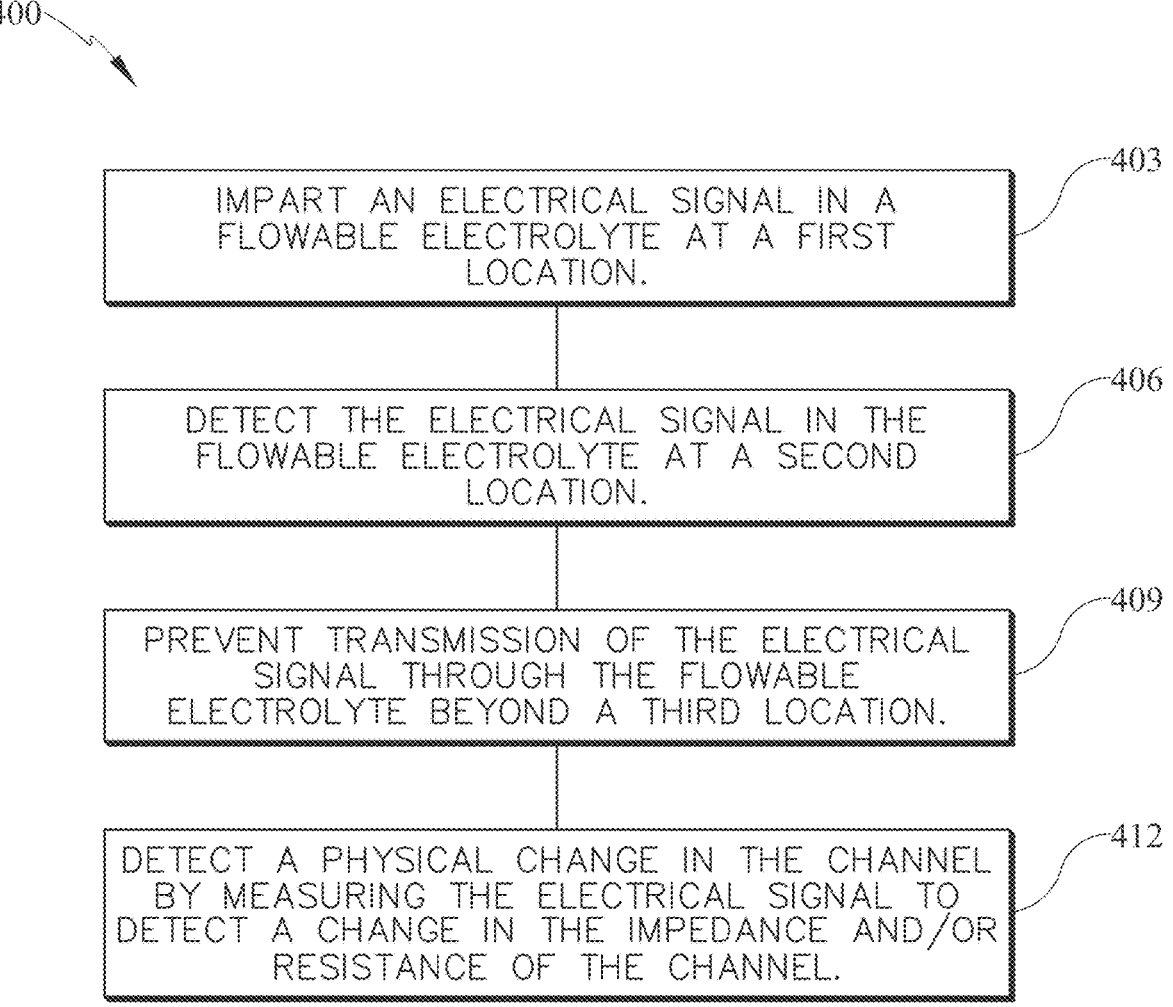
FIG. 10: A chart showing a method according to another embodiment of the present disclosure.

With reference to FIG. 10, in another aspect, the present disclosure may be embodied as a method 400 for data communication. The method 400 includes imparting 403 an electrical signal in a flowable electrolyte of a flow battery at a first location. For example, the flowable electrolyte may be at least partially contained in a channel. A first electrode may be disposed in the channel at a first location and used to impart the electrical signal in the flowable electrolyte. The method may further include detecting 406 the electrical signal in the flowable electrolyte at a second location. For example, a second electrode may be disposed at a second location of the channel (e.g., spaced apart from the first location). The second electrode may be used to detect the electrical signal at the second location.

The method 400 may include preventing 409 the electrical signal from transmission through the flowable electrolyte beyond a third location. For example, a blocking electrode (as described above) may be located at the third location and configured to block the electrical signal (e.g., grounding the signal) while allowing a flow of the flowable electrolyte.

In some embodiments, the method includes detecting 412 a change in impedance and/or resistance of the channel (e.g., a change over time). In this way, a deformation of the channel may be detected by measuring the impedance and/or resistance of the channel.

According to an embodiment of the present disclosure, a multi-functional RFB network can be implemented by adding a signal transmission and sensing function to the RFB network. With the integration of a flow battery system to power a robot or a robotic component, problems resulting from the use of rigid conductors (e.g., rigid, semi-rigid, etc. materials) can be resolved. And, the overall energy density of various applications to which the RFB network is applied can also be improved.

Various embodiments of the present disclosure are further described by the non-limiting examples below.

Example 1. A device, comprising a battery having a first flowable electrolyte; and a first channel containing the first flowable electrolyte of the battery, the first channel having a first electrode configured to impart and/or receive a first electrical signal in the first flowable electrolyte.

Example 2. The device of example 1, wherein the first electrical signal is a digital signal.

Example 3. The device of any one of examples 1-2, wherein the first electrical signal is an encoded signal.

Example 4. The device of any one of examples 1-3, wherein the first channel comprises a tube and/or a reservoir.

Example 5. The device of any one of examples 1-4, wherein at least a portion of the first channel is flexible and/or stretchable.

Example 6. The device of any one of examples 1-5, further comprising a blocking electrode disposed in the first channel and configured to prevent an electrical signal (e.g., the first electrical signal) in the first flowable electrolyte from transmission through the blocking electrode.

Example 7. The device of example 6, wherein the blocking electrode is a mesh through which the first flowable electrolyte can flow, and wherein the mesh is configured to ground an electrical signal in the first flowable electrolyte flowing therethrough.

Example 8. The device of any one of examples 1-7, wherein the battery is a redox flow battery (RFB) or a hybrid RFB.

Example 9. The device of any one of examples 1-8, wherein the flowable electrolyte is a suspension of an active lithium ion compound, a suspension of a vanadium (III) salt, a suspension of an iron (III) salt, or a suspension of a zinc salt.

Example 10. The device of any one of examples 1-9, further comprising a second electrode configured to receive the first electrical signal transmitted through the first flowable electrolyte from the first electrode and/or to impart the first electrical signal into the first flowable electrolyte.

Example 11. The device of any one of examples 1-9, further comprising a second electrode disposed in a second channel containing a second electrolyte, the second electrode being configured to impart and/or receive a second electrical signal in a second flowable electrolyte.

Example 12. The device of example 11, wherein the first electrical signal and the second electrical signal are a differential pair.

Example 13. The device of any one of examples 1-12, further comprising a transceiver in electronic communication with the first electrode.

Example 14. A sensor, comprising a channel containing a flowable electrolyte, at least a portion of the channel being made from a stretchable and/or flexible material; a first electrode at a first location of the channel; and a detector in electronic communication with the first electrode and configured to detect a change in impedance and/or resistance of the channel.

Example 15. The sensor of example 14, further comprising a second electrode at a second location of the channel spaced apart from the first location, and wherein the detector is configured to detect a change in impedance and/or resistance of the channel by measuring a signal transmitted through the flowable electrolyte using the second electrode.

Example 16. The sensor of any one of examples 14-15, wherein the flowable electrolyte is a suspension of an active lithium ion compound, a suspension of vanadium (III) salt, a suspension of iron (III) salt, or a suspension of a zinc salt.

Example 17. The sensor of any one of examples 14-16, wherein the at least a portion of the channel is made from one or more of polydimethylsiloxane (PDMS), silicone, natural and/or synthetic rubber, EcoFlex, Tygon, polyethylene terephthalate (PET), or Polycarbonate (PC).

Example 18. A method for data communication, comprising imparting an electrical signal in a flowable electrolyte at a first location; and receiving the electrical signal in the flowable electrolyte at a second location.

Example 19. The method of example 18, further comprising preventing the electrical signal from transmission through the flowable electrolyte beyond a third location.

Example 20. The method of any one of examples 18-19, wherein each of the first location and the second location are along a length of a channel, and further comprising detecting a deformation in the channel by measuring the electrical signal to determine a change in impedance and/or resistance of the channel.

Example 21. A robot comprising a device according to any one of examples 1-13.

Example 22. The robot of example 21, wherein the robot, or a component of the robot, is powered by the battery of the device.

Example 23. A vehicle comprising a device according to any one of examples 1-13.

Example 24. The vehicle of example 23, wherein the vehicle, or a component of the vehicle, is powered by the battery of the device.

Example 25. The device of example 1, further comprising one or more additional batteries.

Although the present disclosure has been described with respect to one or more particular embodiments, it will be understood that other embodiments of the present disclosure may be made without departing from the spirit and scope of the present disclosure.

What is claimed is:

1. A device, comprising:
a battery having a first flowable electrolyte; and
a first channel containing the first flowable electrolyte of the battery, the first channel having
a first electrode configured to impart and/or receive a first electrical signal in the first flowable electrolyte, wherein the first electrical signal is an encoded signal.

2. The device of claim 1, wherein the first electrical signal is a digital signal.

3. The device of claim 1, wherein the first channel comprises a tube and/or a reservoir.

4. The device of claim 1, wherein at least a portion of the first channel is flexible and/or stretchable.

5. The device of claim 1, wherein the battery is a redox flow battery (RFB) or a hybrid RFB.

6. The device of claim 1, wherein the flowable electrolyte is a suspension of an active lithium ion compound, a suspension of a vanadium (III) salt, a suspension of an iron (III) salt, or a suspension of a zinc salt.

7. The device of claim 1, further comprising a transceiver in electronic communication with the first electrode.

8. The device of claim 1, further comprising a second electrode configured to receive the first electrical signal transmitted through the first flowable electrolyte from the first electrode and/or to impart the first electrical signal into the first flowable electrolyte.

9. The device of claim 1, further comprising a second electrode disposed in a second channel containing a second electrolyte, the second electrode being configured to impart and/or receive a second electrical signal in a second flowable electrolyte.

10. The device of claim 1, wherein the encoded signal comprises a digital signal encoded on a carrier frequency.

11. A device, comprising:
a battery having a first flowable electrolyte;
a first channel containing the first flowable electrolyte of the battery, the first channel having
a first electrode configured to impart and/or receive a first electrical signal in the first flowable electrolyte; and

a blocking electrode disposed in the first channel and configured to prevent the first electrical signal in the first flowable electrolyte from transmission through the blocking electrode.

12. The device of claim 11, wherein the blocking electrode is a mesh through which the first flowable electrolyte can flow, and wherein the mesh is configured to ground an electrical signal in the first flowable electrolyte flowing therethrough.

13. The device of claim 11, further comprising a second electrode configured to receive the first electrical signal transmitted through the first flowable electrolyte from the first electrode and/or to impart the first electrical signal into the first flowable electrolyte.

14. The device of claim 11, further comprising a second electrode disposed in a second channel containing a second electrolyte, the second electrode being configured to impart and/or receive a second electrical signal in a second flowable electrolyte.

15. The device of claim 11, wherein at least a portion of the first channel is flexible and/or stretchable.

16. The device of claim 11, wherein the battery is a redox flow battery (RFB) or a hybrid RFB, and wherein the flowable electrolyte is a suspension of an active lithium ion compound, a suspension of a vanadium (III) salt, a suspension of an iron (III) salt, or a suspension of a zinc salt.

17. A device, comprising:
a battery having a first flowable electrolyte;
a first channel containing the first flowable electrolyte of the battery, the first channel having
a first electrode configured to impart and/or receive a first electrical signal in the first flowable electrolyte; and
a second electrode disposed in a second channel containing a second electrolyte, the second electrode being configured to impart and/or receive a second electrical signal in a second flowable electrolyte, wherein the first electrical signal and the second electrical signal are a differential pair.

18. The device of claim 17, wherein the first electrical signal uses a first carrier frequency different from a second carrier frequency of the second electrical signal, or wherein the first electrical signal and the second electrical signal use different encoding schemes.

19. A method for data communication, comprising:
imparting an electrical signal in a flowable electrolyte at a first location; and receiving the electrical signal in the flowable electrolyte at a second location, wherein each of the first location and the second location are along a length of a channel, and further comprising detecting a deformation in the channel by measuring the electrical signal to determine a change in impedance and/or resistance of the channel.

20. The method of claim 19, further comprising preventing the electrical signal from transmission through the flowable electrolyte beyond a third location.

* * * * *